United States Patent
Kim et al.

(10) Patent No.: US 7,466,096 B2
(45) Date of Patent: Dec. 16, 2008

(54) INTELLIGENT WIPER SYSTEM AND CONTROL METHOD THEREOF

(75) Inventors: Singu Kim, Suwon (KR); Mun-Soon Kwon, Yongin (KR)

(73) Assignees: Hyundai Motor Company, Seoul (KR); Hyundai Autonet Co., Ltd, Incheon (KR)

( * ) Notice: Subject to any disclaimer, the term of this patent is extended or adjusted under 35 U.S.C. 154(b) by 31 days.

(21) Appl. No.: 11/646,114

(22) Filed: Dec. 26, 2006

(65) Prior Publication Data

US 2008/0100246 A1    May 1, 2008

(30) Foreign Application Priority Data

Oct. 31, 2006   (KR) .................. 10-2006-0106644

(51) Int. Cl.
*H02P 7/00* (2006.01)
(52) U.S. Cl. ................ 318/443; 318/445; 318/280
(58) Field of Classification Search ............ 318/443, 318/445, 280; 15/250.001, 250.17
See application file for complete search history.

(56) References Cited

U.S. PATENT DOCUMENTS

| | | | | |
|---|---|---|---|---|
| 6,087,795 A | * | 7/2000 | Amagasa et al. | 318/446 |
| 6,109,672 A | * | 8/2000 | Ponziani | 292/223 |
| 6,400,110 B1 | * | 6/2002 | Yabe et al. | 318/443 |
| 6,555,980 B2 | * | 4/2003 | Yabe | 318/443 |
| 6,940,244 B2 | * | 9/2005 | Mitsumoto | 318/443 |
| 2002/0011812 A1 | * | 1/2002 | Yabe | 318/443 |

FOREIGN PATENT DOCUMENTS

| | | |
|---|---|---|
| KR | 10-1998-034923 | 8/1998 |
| KR | 1998-046243 | 9/1998 |

* cited by examiner

*Primary Examiner*—Bentsu Ro
*Assistant Examiner*—David S Luo
(74) *Attorney, Agent, or Firm*—Morgan, Lewis & Bockius LLP (57) ABSTRACT

A wiper control system and method is disclosed. When an ignition-on switch is turned off while the wiper is being operated, a wiper motor is controlled to return to its home position. When a predetermined switch is operated for more than a predetermined period while the ignition-on switch is turned off, the wiper motor is operated until the operation of the predetermined switch is stopped. When a door lock signal is produced by a remote door controller after an ignition-on switch is turned off while a wiper is being operated, the wiper motor is controlled to return to its home position. When a door unlock signal is produced by a remote door controller while the ignition-on switch is turned off, the wiper motor is controlled to operate for a predetermined period and then to return to its home position.

11 Claims, 7 Drawing Sheets

INTELLIGENT WIPER SYSTEM AND CONTROL METHOD THEREOF

CROSS-REFERENCE TO RELATED APPLICATION

This application claims priority to and the benefit of Korean Patent Application No. 10-2006-0106644 filed in the Korean Intellectual Property Office on Oct. 31, 2006, the entire contents of which are incorporated herein by reference.

BACKGROUND OF THE INVENTION (a) Field of the Invention

The present invention relates to a vehicle wiper apparatus. More particularly, the present invention relates to an intelligent wiper system that intelligently controls a wiper apparatus and a control method thereof.

(b) Description of the Related Art

A wiper apparatus of a vehicle removes foreign materials from a windshield such as snow, rain, and mist so as to provide better view to a driver. The construction and operation of conventional wiper system is generally well known. Such systems include a wiper switch, a controller, a wiper motor, a relay, and a washer motor. The wiper switch is a switch for selecting the wiper operation to a high speed Hi, a low speed Low, or an intermittent operation Int. The controller operates the wiper motor at a predetermined frequency when the wiper switch is selected to the intermittent operation Int. The relay is disposed between the controller and the wiper motor and performs a switching operation according to the intermittent operation control signal of the controller. The wiper motor operates according to the switching operations of the relay. When a washer fluid ejection is selected by the wiper switch, the washer motor ejects a washer fluid according to the control of the controller.

Such a conventional wiper system only operates under the condition that a second terminal IGN2 of an ignition switch remain at an on-position (i.e., the condition that an engine remains running, or in other word, the condition that the ignition switch is turned on).

A typical ignition switch provides several positions of an ignition key, such as, a lock position where the ignition key may be inserted or ejected, an ACC position where a few electric device of a vehicle can be used although the engine is stopped, an ignition-on position where the engine is maintained to run, and a START position where a starting motor is driven so as to start the engine. Hereinafter, the second terminal of the ignition switch implies a terminal thereof that corresponds to the ignition on position, and such an ignition switch having an ignition-on terminal is hereinafter called an ignition-on switch that senses whether the ignition key is turned to the ignition-on position. When it is said that the second terminal of the ignition switch is at an on-state, this implies that the ignition key is positioned to the ignition-on position, and such a state is also called a ignition-on state.

According to the conventional wiper system, the wiper is driven directly by the wiper switch, or driven by the controller. However, when the ignition-on switch is turned off (e.g., when the ignition key is turned to ACC or lock positions from the ignition-on position) while the wiper motor is operating, the power supplied to the wiper motor is cut off. In this case, the wiper stops its movement and cannot go back its home position.

That is, the wiper blade is not returned to the home position but stops on an arbitrary position on the windshield. In order to move the wiper at the arbitrary position on the windshield to the home position, the ignition-on switch should be turned on again, which causes inconvenience to a driver.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide wiper systems including: a wiper motor that operates a wiper; a first input device that outputs wiper operation selection information; a controller that controls the wiper motor according to a signal of the first input device and outputs a home position returning control signal when an ignition-on switch is turned off during an operation of the wiper motor; a first relay that supplies a battery power to the wiper motor by being switched on by the home position returning control signal of the controller; a second relay that is disposed between the controller and the wiper motor and operates the wiper motor at an intermittent operation by being switched by a control signal of the controller; a third relay that is disposed between the controller and the wiper motor, and operates the wiper motor at a low speed by being switched by a control signal of the controller; and a third relay that is disposed between the controller and the wiper motor, and operates the wiper motor at a high speed by being switched by a control signal of the controller.

The wiper system may further include a second input device that generates a door lock or door unlock signal, wherein the controller operates the first and second relays such that the wiper may return to its home position when the door lock signal is generated by the second input device after the ignition-on switch is turned off.

The controller may operate the first and second relays to operate the wiper motor when the door unlock signal is generated by the second input device while the ignition-on switch is turned off.

The first input device may include: a first switch for selecting a single operation of the wiper; a second switch for selecting an intermittent operation of the wiper; a volume for selecting a frequency of the intermittent operation of the wiper; a third switch for selecting a low speed operation of the wiper; a third switch for selecting a high speed operation of the wiper; and a fifth switch for selecting ejection of a washer fluid.

When an operation of a predetermined switch is detected while the ignition-on switch is turned off, the controller may operate the first and second relays to operate the wiper motor until the operation of the predetermined switch stops. The predetermined switch may be a washer fluid switch or a rear glass heating switch.

By the home position returning control signal when an ignition-on switch is turned off during an operation of the wiper motor, the controller may maintain the turning on of the first relay for a predetermined period such that a battery power may be supplied to the wiper motor.

An exemplary control method of an intelligent wiper system according to an exemplary embodiment of the present invention includes: determining whether an ignition-on switch is turned off while a wiper is operated at a selected mode; outputting a home position returning control signal of a wiper when the ignition-on switch is turned off; and returning the wiper to a home position by supplying a battery power to the wiper motor by maintaining turning on of a first relay for a predetermined period in response to the home position returning control signal.

Another exemplary control method of an intelligent wiper system according to an exemplary embodiment of the present invention includes: determining whether an operation of a predetermined switch is detected while an ignition-on switch is turned off; operating first and second relays to operate the wiper by outputting a stopping control signal, when the operation of the predetermined switch is detected; and stopping the wiper at a present position by stopping the operation of the first and second relays when the operation of the predetermined switch is stopped during the operation of the wiper motor. The predetermined switch may be a washer fluid switch or a rear glass heating switch.

Another exemplary control method of an intelligent wiper system according to an exemplary embodiment of the present invention includes: determining whether an ignition-on switch is turned off while a wiper is operated at a selected mode; determining whether a predetermined signal is produced by a remote door controller when the ignition-on switch is turned off while the wiper is operated at the selected mode; outputting a home position returning control signal when the predetermined signal is produced by a remote door controller; and returning the wiper to a home position by supplying a battery power to the wiper motor by maintaining turning on of a first relay for a predetermined period in response to the home position returning control signal. The predetermined signal of the remote door controller may be a door lock signal for locking the door.

Another exemplary control method of an intelligent wiper system according to an exemplary embodiment of the present invention includes: determining whether a door unlock signal is produced by a remote door controller while an ignition-on switch is turned off; operating first and second relays to operate the wiper by outputting a wiper operating signal, when the door unlock signal is produced; and stopping the outputting of wiper operating signal so as to stop the operation of the first and second relays such that the wiper motor is returned to its home position, when the operation of the wiper motor is executed for more than a predetermined period.

DETAILED DESCRIPTION OF THE EMBODIMENTS

Exemplary embodiments of the present invention will hereinafter be described in detail with reference to the accompanying drawings. Accordingly, the drawings and description are to be regarded as illustrative in nature and not restrictive.

Figure 1:
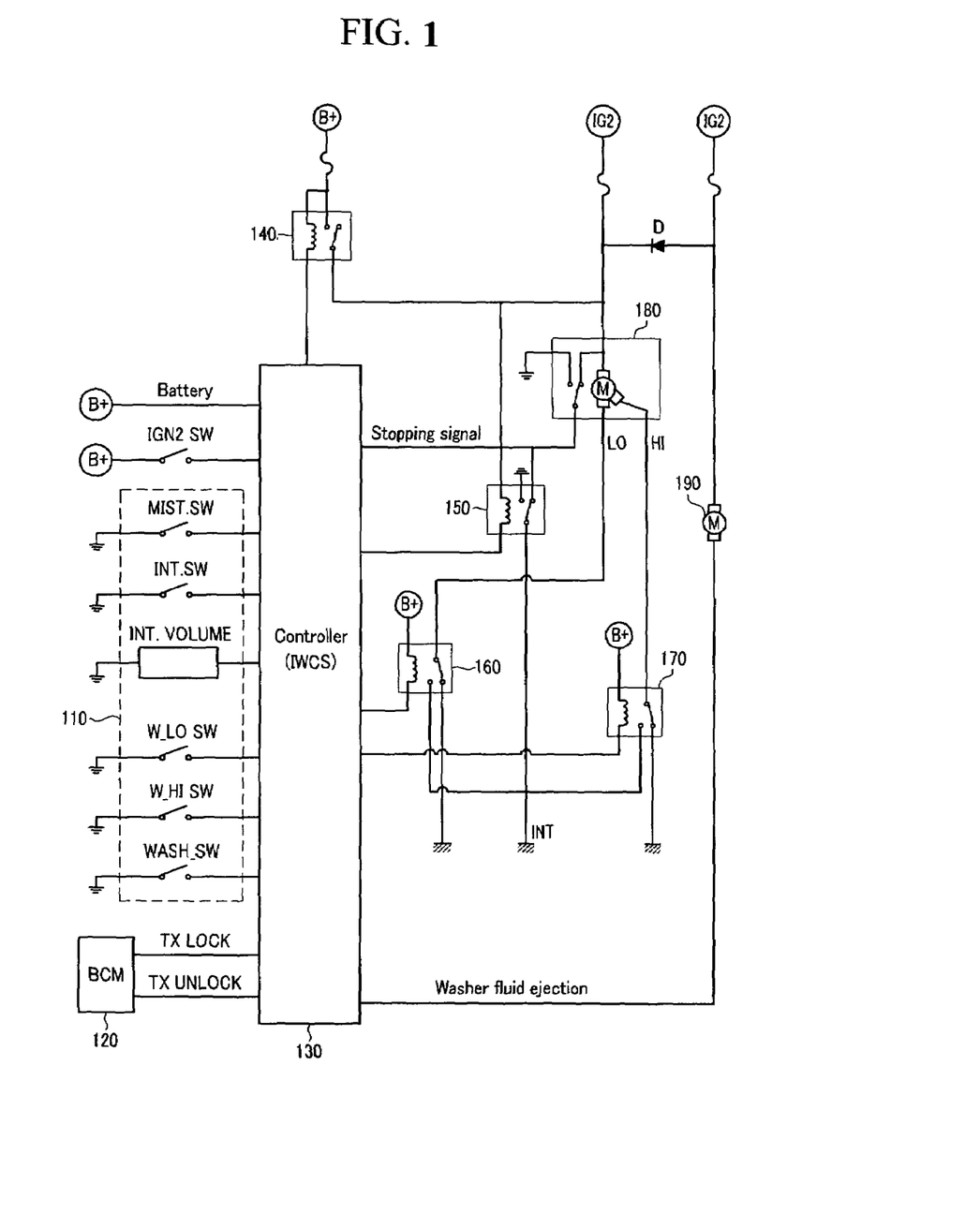
FIG. 1 is a schematic diagram of an intelligent wiper system according to an exemplary embodiment of the present invention.

As shown in FIG. 1, an intelligent wiper system according to an exemplary embodiment of the present invention includes a first input device 110, a second input device 120, a controller 130, a first relay 140, a second relay 150, a third relay 160, a fourth relay 170, a wiper motor 180, a washer motor 190, and an ignition-on switch IGN2 SW. The ignition-on switch IGN2 SW provides a turning on/off information of the ignition-on switch to the controller 130. Controller 130 may comprise a processor, memory, communication - - - and/or other hardware software or firmware as may be selected and programmed by a person of ordinary skill in the art based on the teachings of the present invention as set forth herein.

The first input device 110 is a multifunction switch, and includes a mist switch MIST SW, an intermittent operation switch INT SW, an intermittence volume INT VOLUME, a wiper low-speed switch W_LO SW, a wiper high-speed switch W_HI SW, and a washer fluid switch WASH SW. The mist switch MIST SW is a switch for a selection of a single time operation of the wiper, and sends the selection information to the controller 130. The intermittent operation switch INT SW is a switch for a selection of the intermittent operation of the wiper, and sends the selection information to the controller 130. The intermittence volume INT VOLUME is a switch for a selection of a operation frequency of the wiper at its intermittent operation, and sends the selection information to the controller 130. The wiper low-speed switch W_LO SW is a switch for a selection of a low speed operation of the wiper, and sends the selection information to the controller 130. The wiper high-speed switch W_HI SW is a switch for a selection of a high speed operation of the wiper, and sends the selection information to the controller 130. The washer fluid switch WASH SW is a switch for a selection of an ejection of a washer fluid, and sends the selection information to the controller 130.

In addition, while ignition-on switch IGN2 SW is turned off, the washer fluid switch WASH SW produces a stopping selection signal for stopping the wiper at a driver-desired position, and it sends the stopping selection signal to the controller 130. The various switches in the first input device 110 send the selection information to the controller 130 as a low-side signal.

The second input device 102 is a body control module (BCM). The second input device 102 receives door control information from a remote controller such as a door close RX LOCK or door open RX UNLOCK, and sends the door control information to the controller 130.

When the ignition-on switch IGN2 SW is turned on, the controller 130 controls the operation of the wiper to be a high or low speed operation, intermittent operation, and a single operation, according to a selection signal received from the switches in the first input device 110. The intermittent operation of the wiper is controlling the operation speed of the wiper at a frequency selected by the intermittence volume INT VOLUME provided the first input device 110. When turning off of the ignition-on switch IGN2 SW is detected while controlling the wiper operation at the turned-on state of the ignition-on switch IGN2 SW, the controller 130 performs home position returning control of the wiper.

In order for the home position returning control of the wiper, the controller 130 outputs a delay signal for maintaining the operation of the first relay 140 for a predetermined period, even if the turning-off of the ignition-on switch IGN2 SW is detected. In addition, when a predetermined type of operation of the washer fluid switch WASH SW in the first input device 110 is detected while the wiper is at its home position by turning off the ignition-on switch IGN2 SW, the controller 130 outputs a control signal for operating the wiper such that the wiper may be stopped at a position desired by a driver.

The switch for controlling the wiper to the position desired by the driver is not necessarily limited to the the washer fluid switch WASH SW. Other switches such as a rear glass heating switch for heating a rear glass may also be used as the switch for controlling the wiper to the position desired by the driver. In addition, in the case that the wiper stops at a position that is not the home position by turning off of the ignition-on switch IGN2 SW, the controller 130 also performs the home position returning control of the wiper in response to a detection of the door lock (TX LOCK) signal of the remote door controller by the second input device 120.

In addition, when the door unlock (TX UNLOCK) signal of the remote door controller by the second input device 120 is detected at a parked state of a vehicle where the ignition-on switch IGN2 SW remains at a turned-off state, the controller 130 operates the wiper for a predetermined period such that the foreign materials staying on the windshield glass may be removed before entrance of the driver.

The first relay 140 is hereinafter called an intelligent wiper control system (IWCS) relay, and it is switched by a control signal outputted from the controlled so as to provide a battery power B+ to the wiper motor 180. The first relay 140 is switched on according to the control signal of the controller 130 even if the ignition-on switch IGN2 SW is turned off. By the switching on of the first relay 140, the battery power B+ is supplied to the wiper motor 180 for a predetermined period such that the home position returning control, stopping control to a desired position, and other controlled function according to an embodiment of the present invention may be enabled.

The second relay 150 is a wiper relay, and enables the intermittent operation of the wiper motor 180 by being switched on/off by a control signal outputted from the controller 130 according to an operation of the intermittent operation switch INT SW in the first input device 110.

The third relay 160 is a wiper low-speed relay, and enables the low-speed operation of wiper motor 180 by being switched on by a control signal outputted from the controller 130 according to an operation of the wiper low-speed switch W_LO SW in the first input device 110.

The fourth relay 170 is a wiper high-speed relay, and enables the high-speed operation of wiper motor 180 by being switched on by a control signal outputted from the controller 130 according to an operation of the wiper high-speed switch W_HI SW in the first input device 110.

The wiper motor 180 is connected with battery power B+ supplied through the IWCS relay 140 and the power IG2 supplied through the ignition-on switch that are coupled in parallel. The second to fourth relays 150, 160, and 170 are connected with the wiper motor 180 for the control thereof. The wiper motor 180 performs its intermittent operation according to turning on/off of the second relay 150. In the case that the low speed operation is selected by the second relay 150 or the high speed operation is selected by the third relay 160, the wiper motor 180 operates at a predetermined high or low speed that is fixed by the hardware structure.

When the washer fluid switch WASH SW in the first input device 110 is turned on while the ignition-on switch IGN2 SW remains at its turned-on state, the washer motor 190 is operated by a control signal from the controller 130 and ejects the washer fluid to the windshield glass. In FIG. 1, it is shown that the power IG2 is supplied to the wiper motor 180 and the washer motor 190 in parallel paths. Such power paths are connected through a diode D such that power supplying to the wiper motor 180 may become more stable.

In the above description, a few functions of the intelligent wiper system according to an exemplary embodiment of the present invention have been described. Hereinafter, an automatic home position returning control of the wiper system is described with reference to FIG. 2.

Figure 2:
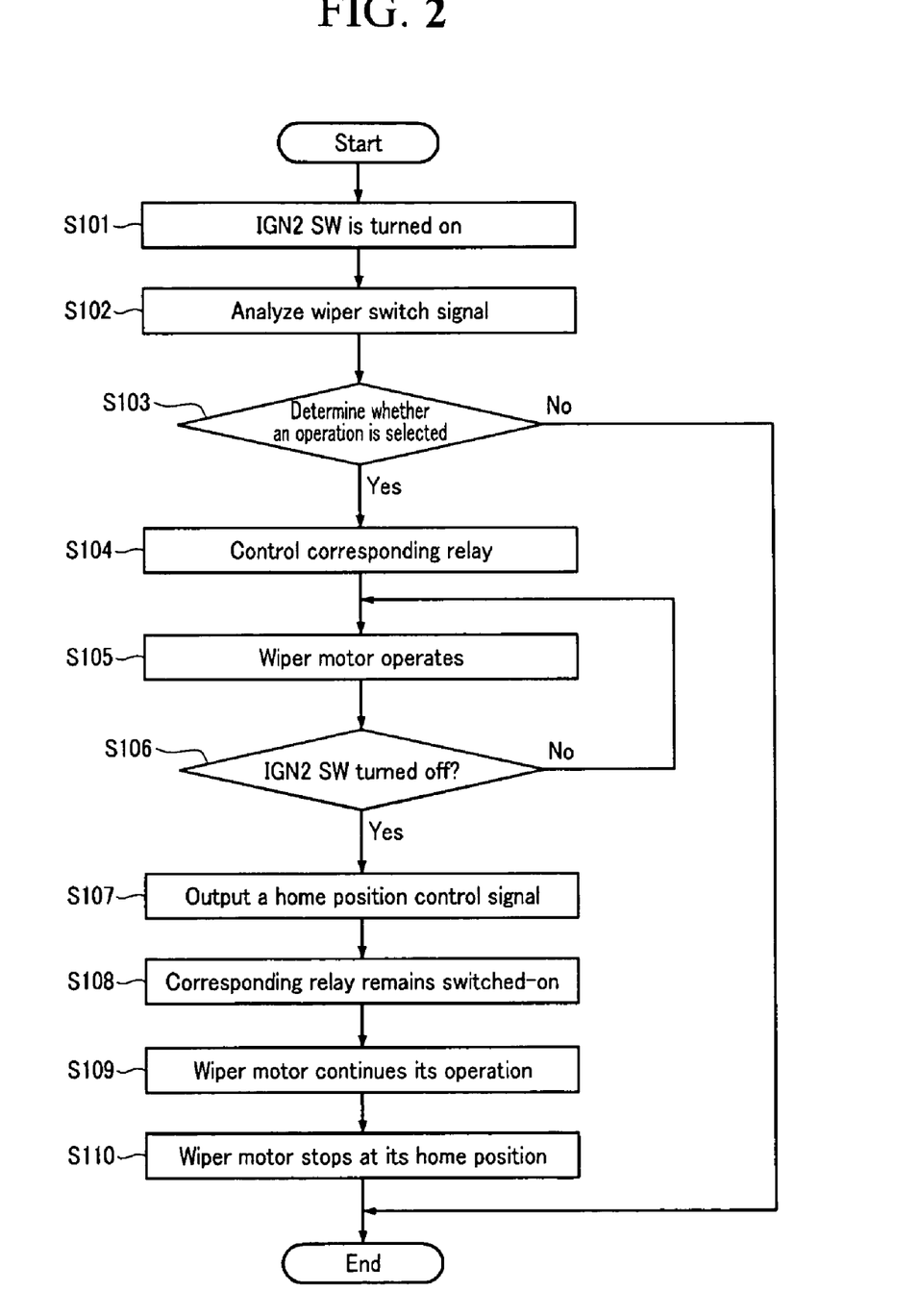
FIG. 2 is a flowchart of an automatic home position returning control of an intelligent wiper system according to an exemplary embodiment of the present invention.

When the ignition-on switch IGN2 SW is at its turned-on state at step S101, the controller 130 analyzes a signal of the wiper switch in the first input device 110 at step S102, and it determines at step S103 whether any function is selected.

When the wiper operation is not selected at the step S103, the controller maintains a current position of the wiper. When the selected operation of the wiper operation is either a single time operation is selected by the mist switch MIST SW, intermittent operation by the intermittent operation switch INT SW, a high speed operation by the high speed operation switch W_HI SW, or a low speed operation by the low speed operation switch W_HO SW, the controller 130 controls a corresponding relay at step S104 so as to operate the wiper motor 180 to perform the selected operation at step S105.

Figure 3:
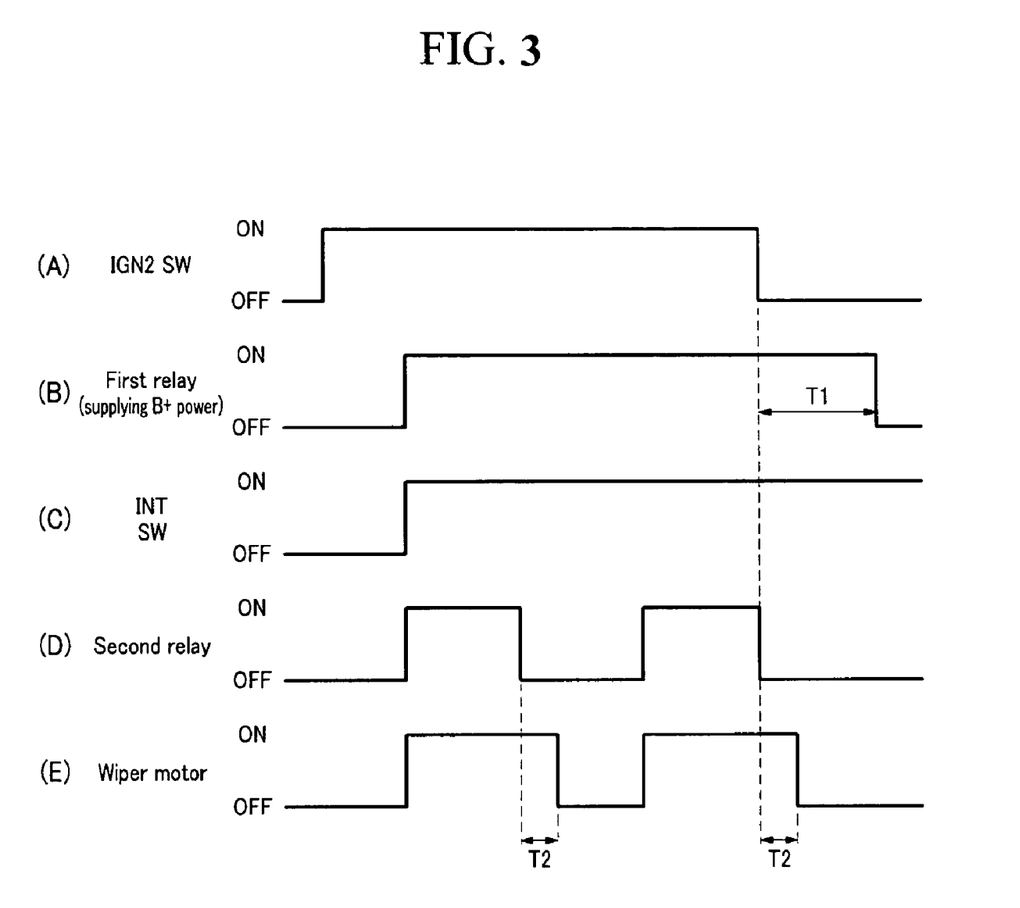
FIG. 3 is a timing diagram of an automatic home position returning control of an intelligent wiper system according to an exemplary embodiment of the present invention.

In FIG. 3, when the intermittent operation switch INT SW is turned on as shown in (C) while the ignition-on switch IGN2 SW is at its turned-on state as shown in (A), the controller 130 outputs a control signal as shown in (B) to the first relay 140 so as to turn on the first relay 140.

The controller 130 outputs a control signal to the second relay 150 as shown in (D) in correspondence with the frequency selected by the intermittence volume INT VOLUME so as to turn it on/off, and operates the wiper motor 180 as shown in (E).

The wiper motor 180 operates in accordance with turning on and off of the second relay 150, and while doing so, the wiper motor 180 further operates by a predetermined period T2 after the turning off of the second relay 150 such that the home position stopping of the wiper motor 180 is realized.

When the selection of the low speed operation of the wiper is detected by the first input device 110, the controller 130 turns on the first relay 140, and at the same time, turns on the third relay 160 that is a wiper low-speed relay. Therefore, wiper motor 180 operates at the fixed low speed.

When the selection of the high speed operation of the wiper is detected by the first input device 110, the controller 130 turns on the first relay 140, and at the same time, turns on the fourth relay 170 that is a wiper high-speed relay. Therefore, wiper motor 180 operates at the fixed high speed.

When the selection of the washer fluid switch WASH SW is detected, the controller 130 operates the washer motor 190 so as to eject the washer fluid to the windshield glass.

While controlling the operation of the wiper motor 180 according to the signal of the first input device 110 as described above, the controller 130 determines at step S106 whether the ignition-on switch IGN2 SW is turned off.

When the ignition-on switch IGN2 SW is not turned off, the controller 130 continues the controlling of the wiper motor 106. When the ignition-on switch IGN2 SW is turned off, the controller 130 outputs a home position control signal at step S107 so as to maintain the switched-on stated of the first relay 140 for a predetermined period at step S108.

Therefore, for that predetermined period, the battery power B+ is supplied to the wiper motor 180 through the first relay 140, and thus the wiper motor 180 continues its operation at step S109.

The controller 130 outputs the home position control signal for the predetermined period T1 (e.g., for 5 seconds) such that the wiper motor 180 may complete its single operation so as to stop at its home position at step S110.

The above described home position returning control is summarized as follow with reference to FIG. 3. Even if the ignition-on switch IGN2 SW is turned off as shown in (A) while the wiper motor 180 is operated for the intermittent operation, the first relay 140 is maintained to its switched-on state for the predetermined period T1 as shown in (B). Thus, the wiper motor 180 may return to its home position as shown in (E).

As described above, even if the ignition-on switch IGN2 SW is turned off during the operation of the wiper motor, the controller 130 outputs the home position returning control signal so as to supply the power to the wiper motor, and thus the home position returning control of the wiper motor is enable. That is, the wiper is prevented from being stopped at an arbitrary position on the windshield glass.

Figure 4:
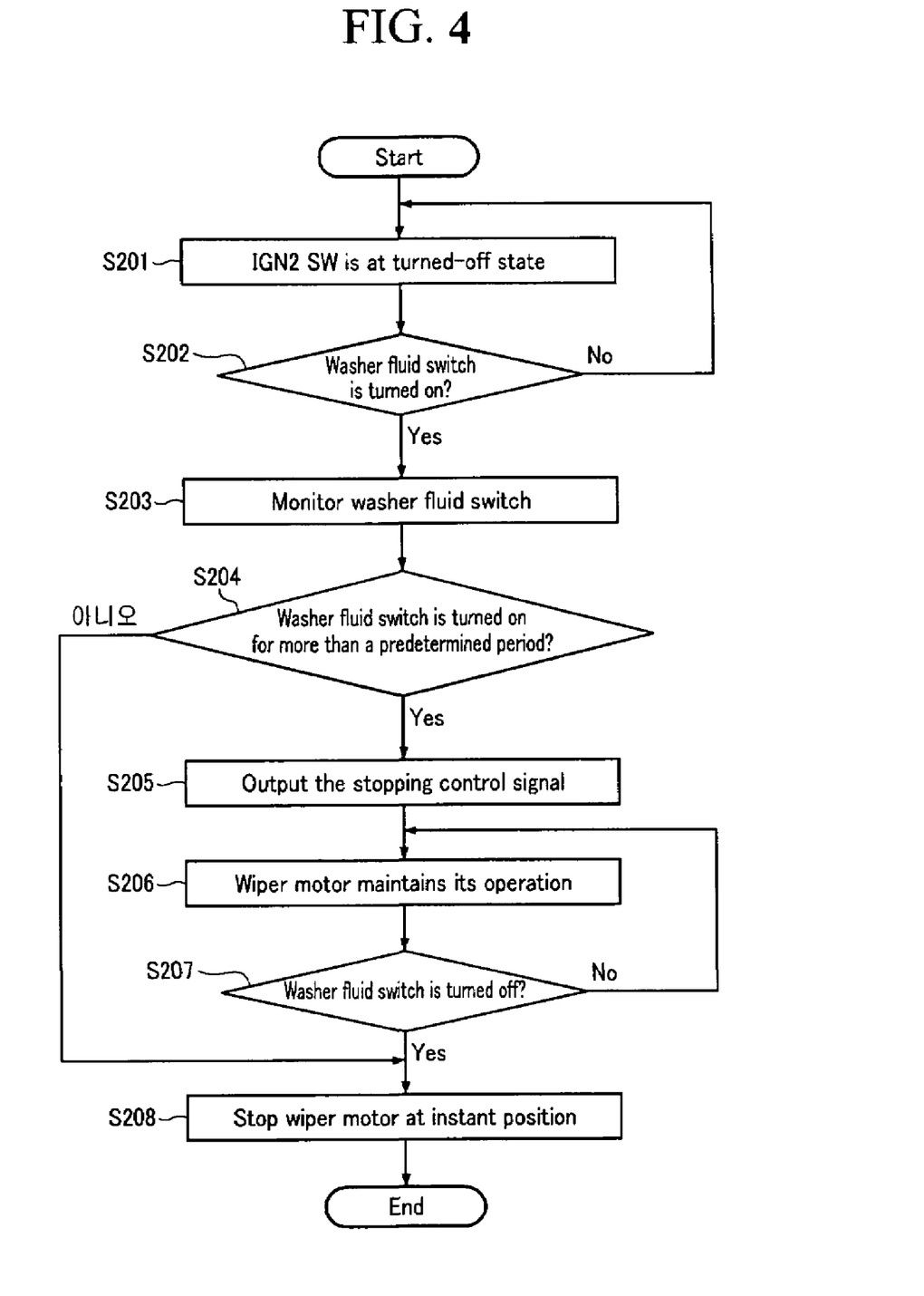
FIG. 4 is a flowchart of a driver intended stopping control of an intelligent wiper system according to an exemplary embodiment of the present invention.

Hereinafter, the stopping position controlling according to an exemplary embodiment is described in detail with reference to FIG. 4 and FIG. 5.

While the ignition-on switch IGN2 SW is turned off at step S201, the controller 130 determines at step S202 whether operation of the washer fluid switch WASH SW in the first input device 110 is detected.

When the washer fluid switch WASH SW is not turned on, the controller 130 maintains current operation of the wiper. When the washer fluid switch WASH SW is turned on, the controller 130 monitors the washer fluid switch WASH SW at step S203, and determines at step S204 whether the washer fluid switch WASH SW is turned on for more than a predetermined period.

When the washer fluid switch WASH SW remains at its turned-on state for more than the predetermined period (e.g., for more than about 2 seconds), the controller 130 determines that the driver hopes to stop the wipe to his desired position and outputs the stopping control signal at step S205.

Figure 5:
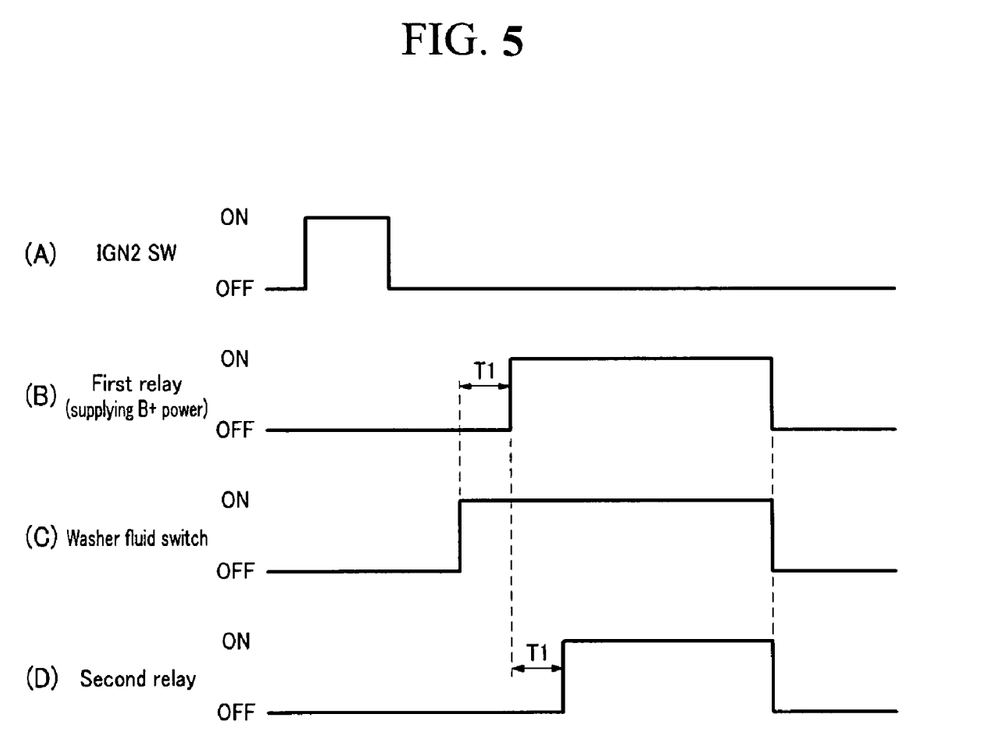
FIG. 5 is a timing diagram of a driver intended stopping control of an intelligent wiper system according to an exemplary embodiment of the present invention.

Referring to FIG. 5, when the washer fluid switch WASH SW is operated for more than a predetermined period T1 (for example, for more than 1 second) as shown in (C) while the ignition-on switch IGN2 SW is at its turned-off state as shown in (A), the controller 130 turns on the first relay 140 as shown in (B). Accordingly, the battery power B+ is supplied to the wiper motor 180 through the first relay 140, and becomes ready to operate.

In such a ready state of the wiper motor 180, when the washer fluid switch WASH SW remains at its turned-on position for more than the predetermined period T1 (for example, for more than 1 second), the controller 130 now turns on the second relay 150 as shown in (D) so as to operate the wiper motor 180. The wiper motor 180 maintains its operation at step S206 while the washer fluid switch WASH SW remains selected.

At step S207, the controller 130 determines whether the wiper is at the desired position by detecting the stoppage of operation of the washer fluid switch WASH SW. If the stoppage of the operation of the washer fluid switch WASH SW is not detected, the controller 130 maintains the operation of the wiper motor 180. If the stoppage of the operation of the washer fluid switch WASH SW is detected, the controller 130 stops the operation of the wiper motor 180 at step S208 such that the wiper may stop at the instant position.

That is, referring to FIG. 5, when the driver stops the operation of the washer fluid switch WASH SW as shown in (C) since the wiper is moved at his desired position, the controller 130 turns off the first relay 140 and the second relay 150 such that the wiper motor 180 is stopped at the instant position.

In the above description, the washer fluid switch is used for the driver to control the wiper position, however, it should be understood that the present invention is not limited thereto. A rear glass heating switch that is usually provided in a vehicle or an additional switch may also be used for such a stopping position control.

According to such a stopping position control, the wiper stopping position may be adjusted by a driver, and thus, changing wiper blade or maintenance of the wiper system becomes more convenient.

In addition, a sheet of paper, vinyl, or plastic may be put on the windshield in order to prevent dust, fog, or frost from being formed on the windshield. In such a case, such a sheet of paper, vinyl, or plastic may be strongly held on the windshield by the wiper blade after moving the wiper blade to a desired position.

Hereinafter, remote controlling of the wiper according to an exemplary embodiment of the present invention is described in detail with reference to FIG. 6 and FIG. 7. Such a remote controlling may provide a convenient function of the wiper system in that the wiper may be controlled to its home position from outside the vehicle, and in that the wiper may be used to remove foreign materials staying on the windshield before entering into the vehicle.

The controller 130 detects a current position of an ignition switch at step S301, and determines whether the ignition-on switch IGN2 SW is at its turned-off state at step S302.

When the ignition-on switch IGN2 SW is found to be at its turned-off state, the controller 130 monitors the second input device 120 at step S303, and determines at step S304 whether the remote door control signal is inputted through the second input device 120.

When remote door controller is inputted, the controller 130 analyzes the inputted signal at step S305, and determines at step S306 whether the inputted signal is a door unlock signal TX UNLOCK.

When the inputted signal is the door unlock signal, the controller 130 outputs a wiper operation control signal at step S307, and controls the first and second relays 140 and 150 at step S308 such that the wiper is accordingly operated at step S309.

Figure 7:
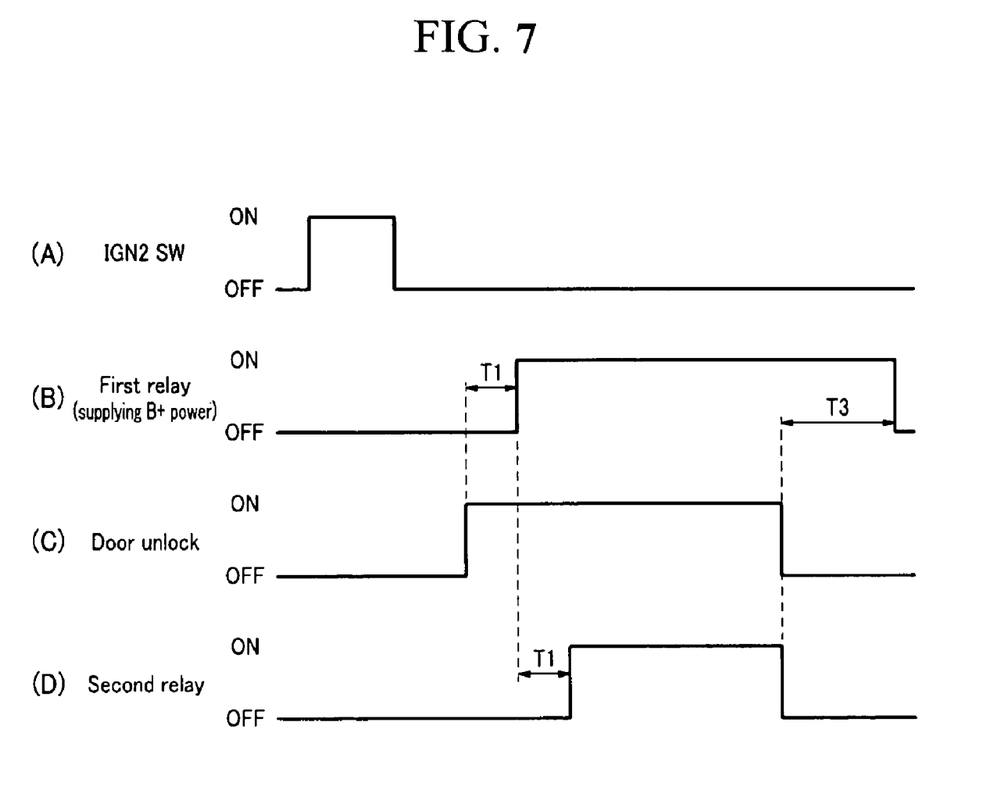
FIG. 7 is a timing diagram of a remote control of an intelligent wiper system according to an exemplary embodiment of the present invention.

As shown in FIG. 7, when the door unlock signal is produced by remote door controller for more than a predetermined period T1 as shown in (C) while when the ignition-on switch IGN2 SW is turned off as shown in (A), the controller 130 turns on the first relay 140 as shown in (B) such that the battery power B+ is supplied to the wiper motor 180.

Subsequently, the predetermined period T1 elapses thereafter as shown in (D), the controller 130 turns on the second relay 150 such that the wiper motor 180 at the step S309. By such an operation, foreign materials staying on the windshield can be removed by operating the wiper motor 180 before entering the vehicle. Then, the controller 130 determines whether the door unlock signal is turned off (that is, whether the inputting of the signal stops) at step S310.

When the door unlock signal continues to be detected, the wiper motor is maintained to be operated through the steps S307-S309. When the door unlock signal is stopped, the controller 130 outputs a wiper stopping control signal at step S311, and the wiper motor 180 stops at its home position at step S312.

Referring to FIG. 7, when the inputting of the door unlock signal stops as shown in (C), the controller 130 synchronously turns off the second relay 150. However, the controller 130 maintains the turning on of the first relay 140 for a predetermined period (for example, for 5 seconds) such that battery power B+ is supplied to the wiper motor 180 for that period so as to enable the wiper motor 180 to return to its home position.

Figure 6:
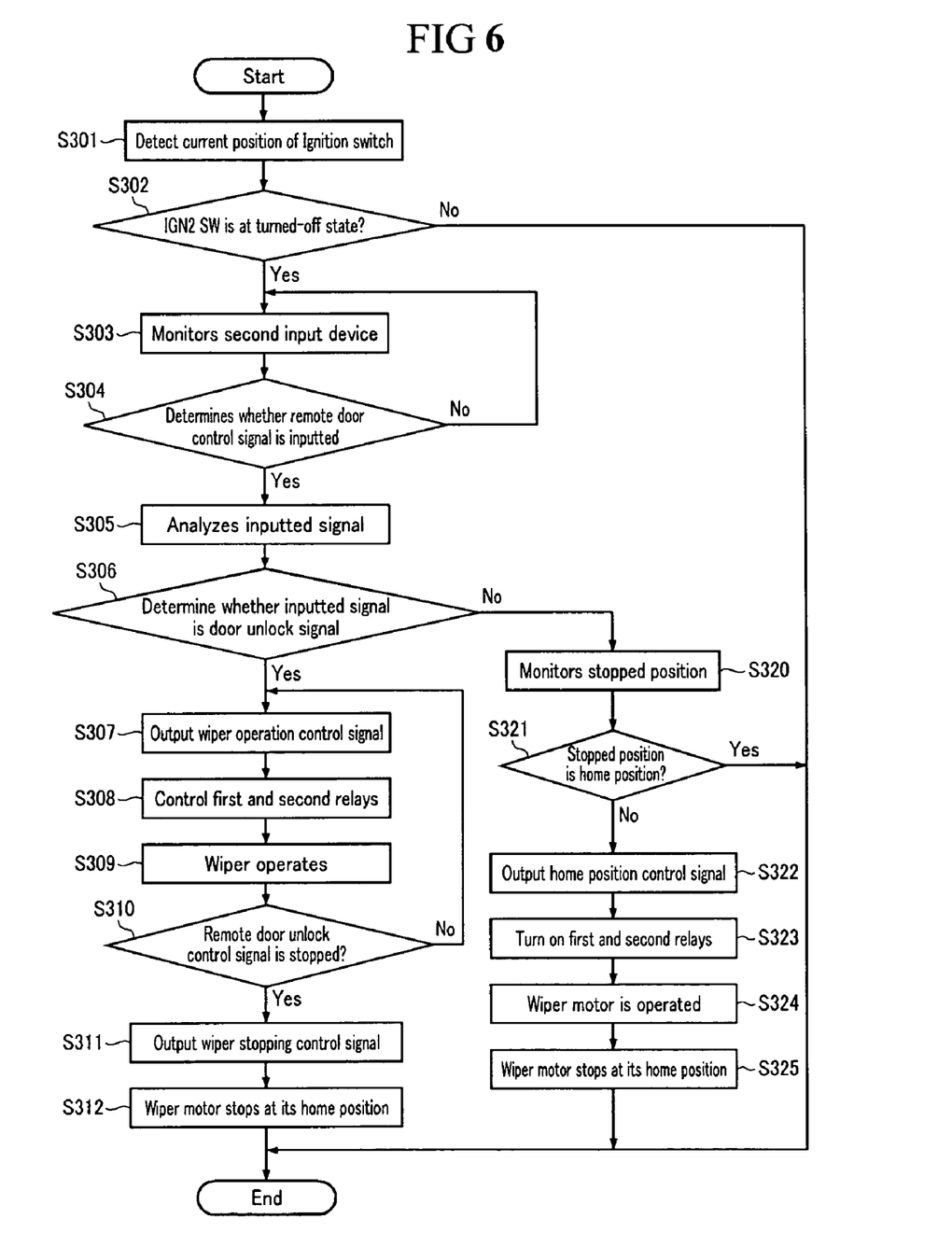
FIG. 6 is a flowchart of a remote control of an intelligent wiper system according to an exemplary embodiment of the present invention.

Referring back to the step S306 shown in FIG. 6, when remote door control signal of the remote door controller is the door lock signal (this is typically the case that a driver locks the door after parking the vehicle), the controller 130 monitors a current stopped position of the wiper at step S320, and determines at step S321 whether the current stopped position is the home position.

When the wiper has not stopped at the home position, the controller 130 outputs the home position control signal at step S322, and controls (that is, turns on) the first and second relays 140 and 150 at step S323. Accordingly, the wiper motor 180 is operated at step S324, and stops at its home position at step S325.

In more detail, the controller 130 turning on the first relay 140 so as to enable the battery power B+ to be supplied to the wiper motor 180, and after a predetermined period therefrom, the controller 130 turns on the second relay 150 so as to move the motor 180 to its home position.

In the above description, remote door controller is used to lock and unlock operation and such an operation signal is used for controlling the wiper. However, it should be understood that the present invention is limited thereto. As a variation, a non-remote hardware door key may be used to lock and unlock the door, and the operation may be detected such that the detected signal is used for controlling the wiper.

As described above, according to exemplary embodiments of the present invention, the wiper can return to its home position even if the ignition-on switch is turned off while the wiper is moving. Therefore, stability an reliability of the wiper operation can be enhanced. In addition, the stopping position of the wiper may be easily controlled by the driver, and thus convenience in maintenance of the wiper may be enhanced. Furthermore, home position returning control and advanced operation of the wiper before entering the vehicle is enabled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wiper system, comprising:
   a wiper motor that operates a wiper;
   a first input device that outputs wiper operation selection information;
   a controller that controls the wiper motor according to a signal of the first input device and outputs a home position returning control signal when an ignition-on switch is turned off during an operation of the wiper motor;
   a first relay that supplies a battery power to the wiper motor by being switched on by the home position returning control signal of the controller;
   a second relay that is disposed between the controller and the wiper motor and operates the wiper motor at an intermittent operation by being switched by a control signal of the controller;
   a third relay that is disposed between the controller and the wiper motor, and operates the wiper motor at a low speed by being switched by a control signal of the controller;
   a fourth relay that is disposed between the controller and the wiper motor, and operates the wiper motor at a high speed by being switched by a control signal of the controller; and
   a second input device that generates a door lock or door unlock signal,
   wherein the controller operates the first and second relays such that the wiper may return to its home position when the door lock signal is generated by the second input device after the ignition-on switch is turned off.

2. The wiper system of claim 1, wherein the controller operates the first and second relays to operate the wiper motor when the door unlock signal is generated by the second input device while the ignition-on swith is turned off.

3. A wiper system, comprising:
   a wiper motor that operates a wiper;
   a first input device that outputs wiper operation selection information;
   a controller that controls the wiper motor according to a signal of the first input device and outputs a home position returning control signal when an ignition-on switch is turned off during an operation of the wiper motor;
   a first relay that supplies a battery power to the wiper motor by being switched on by the home position returning control signal of the controller;
   a second relay that is disposed between the controller and the wiper motor and operates the wiper motor at an intermittent operation by being switched by a control signal of the controller;
   a third relay that is disposed between the controller and the wiper motor, and operates the wiper motor at a low speed by being switched by a control signal of the controller; and
   a fourth relay that is disposed between the controller and the wiper motor, and operates the wiper motor at a high speed by being switched by a control signal of the controller;
   wherein, when an operation of a predetermined switch is detected while the ignition- on switch is turned off, the controller operates the first and second relays to operate the wiper motor until the operation of the predetermined switch stops.

4. The wiper system of claim 3, wherein the predetermined switch is a washer fluid switch or a rear glass heating switch.

5. A wiper system, comprising:
   a wiper motor that operates a wiper;
   a first input device that ouputs wiper operation selection information;
   a controller that controls the wiper motor according to a signal of the first input device and outputs a home position returning control signal when an ignition-on switch is turned off during an operation of the wiper motor;
   a first relay that supplies a battery power to the wiper motor by being switched on by the home position returning control signal of the controller;
   a second relay that is disposed between the controller and the wiper motor and operates the wiper motor at an intermittent operation by being switched by a control signal of the controller;
   a third relay that is disposed between the controller and the wiper motor, and operates the wiper motor at a low speed by being switched by a control signal of the controller; and a fourth relay that is disposed between the controller and the wiper motor, and operates the wiper motor at a high speed by being switched by a control signal of the controller;

wherein, by the home position returning control signal when an ignition-on switch is turned off during an operation of the wiper motor, the controller maintains the turning on of the first relay for a predetermined period such that a battery power may be supplied to the wiper motor.

6. A control method for a wiper, comprising:

determining whether an ignition-on switch is turned off while a wiper is operated at a selected mode;

outputting a home position returning control signal of a wiper when the ignition-on switch is turned off; and returning the wiper to a home position by supplying a battery power to the wiper motor by maintaining turning on of a first relay for a predetermined period in response to the home position returning control signal.

7. A control method for a wiper, comprising:

determining whether an operation of a predetermined switch is detected while an ignition-on switch is turned off;

operating first and second relays to operate the wiper by outputting a stopping control signal, when the operation of the predetermined switch is detected; and stopping the wiper at a present position by stopping the operation of the first and second relays when the operation of the predetermined switch is stopped during the operation of the wiper motor.

8. The control method of claim 7, wherein the predetermined switch is a washer fluid switch or a rear glass heating switch.

9. A control method of a wiper comprising:

determining whether an ignition-on switch is turned off while a wiper is operated at a selected mode;

determining whether a predetermined signal is produced by a remote door controller when the ignition-on switch is turned off while the wiper is operated at the selected mode;

outputting a home position returning control signal when the predetermined signal is produced by a remote door controller; and returning the wiper to a home position by supplying a battery power to the wiper motor by maintaining turning on of a first relay for a predetermined period in response to the home position returning control signal.

10. The control method of claim 9, wherein the predetermined signal of the remote door controller is a door lock signal for locking the door.

11. A control method of a wiper comprising:

determining whether a door unlock signal is produced by a remote door controller while an ignition-on switch is turned off;

operating first and second relays to operate the wiper by outputting a wiper operating signal, when the door unlock signal is produced; and stopping the outputting of wiper operating signal so as to stop the operation of the first and second relays such that the wiper motor is returned to its home position, when the operation of the wiper motor is executed for more than a predetermined period.

* * * * *